INVENTOR
J. P. KINZER
BY E. V. Griggs
ATTORNEY

INVENTOR
J. P. KINZER
BY E. V. Griggs
ATTORNEY

INVENTOR
J. P. KINZER
BY E. V. Griggs
ATTORNEY

Patented Mar. 14, 1950

2,500,417

UNITED STATES PATENT OFFICE 2,500,417

ELECTRICAL RESONATOR

John P. Kinzer, Ridgefield, N. J., assignor to Bell Telephone Laboratories, Incorporated, New York, N. Y., a corporation of New York Application April 13, 1945, Serial No. 588,202

1 Claim. (Cl. 178—44)

This invention relates to electrical resonance systems and more particularly to tunable cavity resonators.

An object of the invention is to provide a tunable cavity resonator capable of tuning successively to any frequency within a continuous band of frequencies and having such characteristics that at any setting of the tuning device the resonator will support oscillations of only one frequency falling within the band.

Another object of the invention is to provide a tunable cavity resonator which shall have no extraneous responses within the band over which it may be tuned.

It is well known that an electrical circuit having a capacity reactance element and an inductive reactance element may support oscillations initiated therein if its dissipation factor is sufficiently low. For the customary tuned circuit having "lumped" reactances with a single degree of freedom the natural resonance frequency is uniquely determined by the magnitudes of the reactances and resistances of the impedance elements. In fact, for most purposes, a sufficiently accurate result may be had if only the reactances are considered. If, however, there be a plurality of branches or meshes giving rise to a plurality of different degrees of freedom, the circuit may support oscillations at each frequency involved if the dissipation factor for that particular frequency or different mode of resonance is sufficiently low.

Cavity resonators resemble circuits of several degrees of freedom. In general each resonator has a plurality of modes of resonance at each of which it is capable of sustaining natural resonance oscillations for a time dependent upon its configuration and its dissipational characteristics. It is customary to denote various modes by letters and subscripts. In one well-known method which will be adopted for the purposes of this disclosure oscillations of modes in which the electric vector is confined to a plane perpendicular to the longitudinal axis of a cylinder are termed transverse electric (TE) mode oscillations and those in which the magnetic vector is confined to the same perpendicular plane are denoted transverse magnetic (TM) mode oscillations. Three subscripts $l$, $m$, and $n$ are used. For transverse electric mode ($TE_{lmn}$) the subscripts are employed with the following significance:

$l$=number of full period variations of radial component of electric field around the angular coordinate, $m$=number of half period variations of angular component of electric field along the radial coordinate and $n$=number of half period variations of radial component of electric field along the axial coordinate.

Similarly for transverse magnetic modes ($TM_{lmn}$) the subscripts $lmn$ are employed with a corresponding significance and indicate the numbers of periodic variations of the respective components of the magnetic field along the same coordinates.

It may transpire that some of these modes of resonance occur at closely adjacent frequencies. In fact, for $TE_0$ and $TM_1$ modes the oscillations for a perfect right circular cylinder occur in pairs at the same frequency so that e. g. $TE_{019}$ and $TM_{119}$ oscillations may exist simultaneously and, if so, will be of identical frequency. Moreover, oscillations of some of these closely adjacent frequencies may be intercoupled with oscillations of desired resonance modes by reason of any slight dissymmetry in the resonator or in the coupling device by which it is associated with an external circuit so as to interfere with or mask the result of the desired mode. In fact, it is the usual experience to find that the quality factor Q of a $TE_0$ mode resonator is reduced for oscillations of a given $TE_0$ mode by the presence of oscillations of the equal frequency $TM_1$ mode, the dissipation of energy by the transverse magnetic mode appearing to absorb energy from that available for the transverse electric mode oscillations. Such interferences vitiate the performance of cavity resonators in their selective operation. For these reasons it is highly desirable to free such resonators from such spurious responses.

The fact that the volume and the dimensional relationships of a cavity resonator undergo variation as the resonator tuning is varied gives rise to the additional possibility that an extraneous mode of oscillation which is not troublesome at one setting of the tuner may at another setting result in oscillations of some frequency within the band. Under these circumstances the resonator would exhibit the characteristic of resonance at the same frequency at two different settings of the tuner. This is obviously an undesirable circumstance which should be inhibited.

In accordance with the invention a cavity resonator is designed as a right circular cylinder with a movable end tuning piston for operation with $TE_{01n}$ mode oscillations and the ratio of the diameter D to the length L of the cylinder is made such as to enable the device to support oscillations of the $TE_{01n}$ mode at a desired frequency. Equal frequency $TM_{11n}$ oscillations are inhibited by apertures or discontinuities in the structure which are concentric with the longitudinal cylindrical axis and interrupt the conducting paths which are traversed by the oscillations of transverse magnetic modes. Transverse electric oscillations of other modes than $TE_{01n}$ and particularly those of $TE_{01(n+1)}$ and $TE_{02}$ modes are avoided by confining the tuning piston motion to a range of settings which has its minimum $TE_{01(n+1)}$ frequency above the maximum frequency of the desired $TE_{01n}$ mode oscillations, its maximum $TE_{01(n-1)}$ frequency below the minimum frequency of the desired $TE_{01n}$ mode oscillations and which includes no frequency corre sponding to $TE_{02}$ mode oscillations. The resulting device is capable of tuning over a continuous range of frequencies from a lower limiting frequency at one end to an upper limiting frequency at the other. Within that range of frequencies oscillations of only a single mode occur so that for each setting of the tuner there is a single frequency response.

In the drawing Fig. 1 is a mode chart showing the relationship of frequency to dimensions of a cylindrical resonator;

For reasons of economy and efficiency it is found desirable to use as variable frequency cavity resonators right circular cylinders having one end movable to tune over the range of frequencies desired and to operate them with $TE_{01n}$ mode oscillations. The dimensional limitations involved are of various kinds. In the first place it is well known that oscillations requiring standing waves are supportable only in a structure the dimensions of which are of the order of at least one-half wavelength. Consequently the diameter D and the length L have minimum dimensions which can be used.

Calculation of the dimensions of a right cylindrical cavity resonator may begin with the following equation:

$$\lambda=\frac{2}{\sqrt{\left(\frac{2r}{\pi D}\right)^2+\left(\frac{n}{L}\right)^2}} \qquad (1)$$

Where $\lambda$ is the wavelength in free space $r$ is the $m$th root of the Bessell function $J_1(x)=0$ for transverse magnetic (TM) modes and $r=m$th root of the Bessel function $J_1'(x)=0$ for the transverse electric (TE) modes. Equation 1 may be readily put in the form $$(fD)^2=\left(\frac{cr}{\pi}\right)^2+\left(\frac{cn}{2}\right)^2\left(\frac{D}{L}\right)^2 \qquad (2)$$

Equation 2 may be rewritten $$(fD)^2=A+Bn^2\left(\frac{D}{L}\right)^2 \qquad (3)$$

which, for any given mode and hence given $n$, is the equation of a straight line relating $(fD)^2$ to $$\left(\frac{D}{L}\right)^2$$

Recalling that $C=2.988\times10^{10}$ centimeters per second, and that $n$ is the third subscript of the mode, we may readily calculate the following table of magnitudes and from them may plot each mode line from Equation 3 to show the relationships between the dimensions of the resonator and the various frequencies to which it is responsive for that particular mode:

| Mode | $r$ | A |
|---|---|---|
| $TM_{01n}$ | 2.4048 | $5.267\times10^{20}$ |
| $TM_{02n}$ | 5.5201 | 27.750 |
| $TM_{03n}$ | 8.6537 | 68.198 |
| $TM_{11n}$ | 3.8317 | 13.371 |
| $TM_{12n}$ | 7.0156 | 44.822 |
| $TM_{13n}$ | 10.1735 | 94.255 |
| $TM_{21n}$ | 5.1356 | 24.019 |
| $TM_{22n}$ | 8.4174 | 64.524 |
| $TM_{31n}$ | 6.3800 | 37.069 |
| $TM_{32n}$ | 9.7608 | 86.764 |
| $TM_{41n}$ | 7.5884 | 52.441 |
| $TM_{51n}$ | 8.7717 | 70.070 |
| $TM_{61n}$ | 9.9364 | 89.912 |
| $TE_{01n}$ | 3.8317 | 13.371 |
| $TE_{02n}$ | 7.0156 | 44.822 |
| $TE_{03n}$ | 10.1735 | 94.255 |
| $TE_{11n}$ | 1.8412 | 3.087 |
| $TE_{12n}$ | 5.3315 | 25.886 |
| $TE_{13n}$ | 8.5363 | 66.359 |
| $TE_{21n}$ | 3.0543 | 8.496 |
| $TE_{22n}$ | 6.7059 | 40.952 |
| $TE_{23n}$ | 9.9696 | 90.514 |
| $TE_{31n}$ | 4.2014 | 16.075 |
| $TE_{32n}$ | 8.0155 | 58.509 |
| $TE_{41n}$ | 5.3175 | 25.751 |
| $TE_{42n}$ | 9.2826 | 78.470 |
| $TE_{51n}$ | 6.4154 | 37.481 |
| $TE_{61n}$ | 7.5012 | 51.243 |
| $TE_{71n}$ | 8.5781 | 67.011 |
| $TE_{81n}$ | 9.6480 | 84.769 |

$B=2.2470\times10^{20}$.

Figure 1:
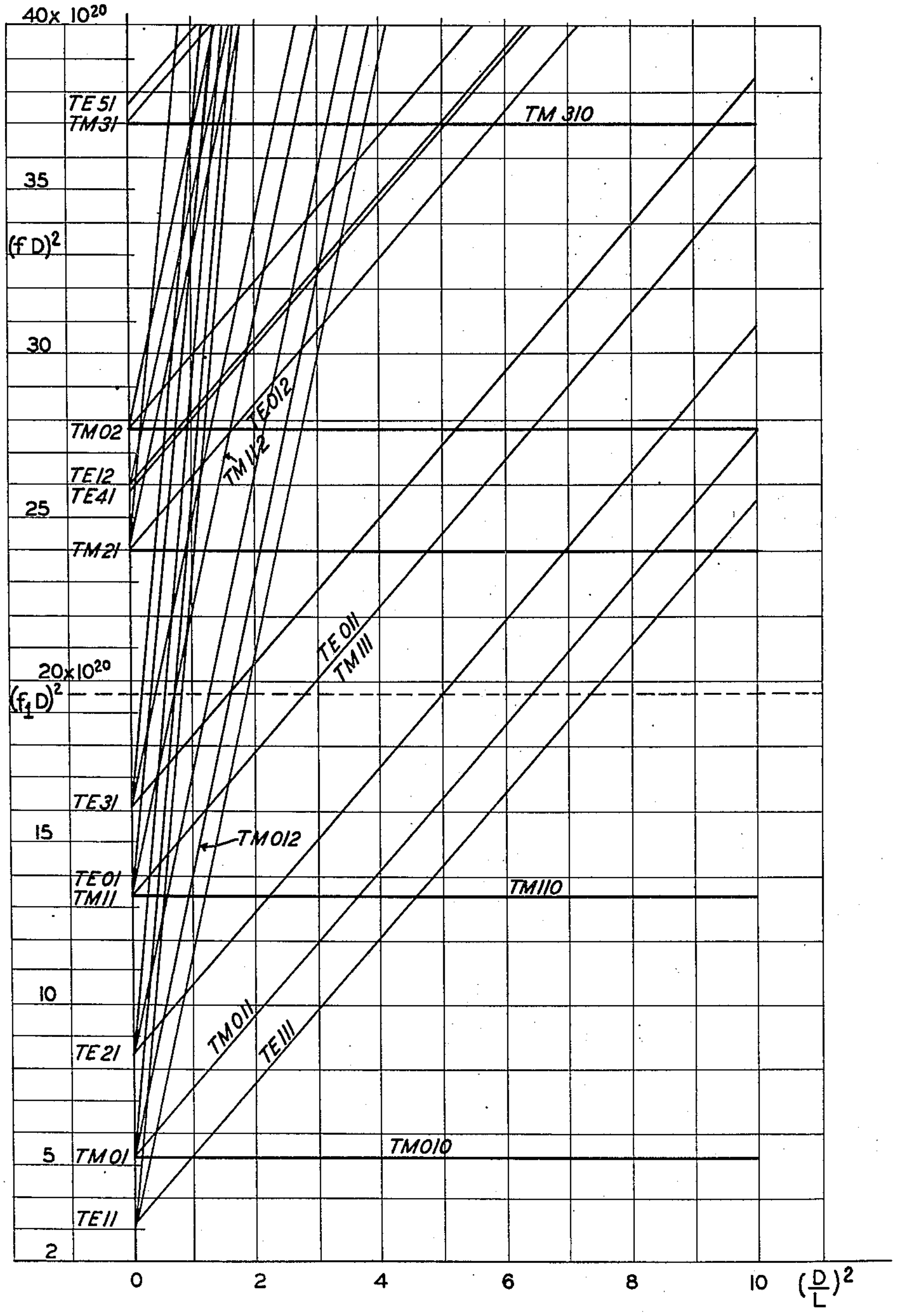

The mode lines plotted as described yield the mode chart of Fig. 1. The designations $TE_{51}$, $TM_{31}$, etc. in which only the first two digits of the complete mode number are given refer to the intercepts on the $(fD)^2$ axis. The third subscript determines the slope of the various lines. All modes having 1 for a final digit ($TE_{111}$, $TM_{011}$, $TE_{211}$, etc.) will be parallel to the $TE_{111}$ line. All modes having 2 for the final digit ($TE_{112}$, $TM_{012}$, $TE_{212}$, etc.) will be parallel to the $TE_{112}$ mode line and have four times the slope of the 1 lines. In other words, the slopes are proportional to the square of the third or $n$ subscript. All TM modes have a line of zero slope. No TE modes have such a zero slope line. It is clear from this mode chart, that for a given value of $$\frac{D}{L}$$

there are many values of $fD$ corresponding to the responses of various modes. Similarly, for a given value of $fD$, there are many values of $$\frac{D}{L}$$

corresponding to the various resonances. In the design of a tunable cavity resonator to cover a range of frequencies, in the nature of things, $$\frac{D}{L}$$

is variable. It is therefore highly desirable to choose a range of variation of $$\frac{D}{L}$$

which gives the greatest freedom from responses other than that of the desired mode. This problem may be solved by the use of a mode chart like that of Fig. 1.

The mode chart of Fig. 1 is a very practical one to use since within reasonable limits it enables tubing or bored cylinders of standard diameters to be used if these are available in fairly close sequence of magnitudes. For any given D, new non-linear scales may be added to the mode chart which addition will now make it direct reading in internal length vs. frequency. Measurements made on an experimental model will then permit direct and immediate identification of all responses. An identification of any extraneous mode is essential to its suppression, as such identification leads immediately to a knowledge of the internal field configurations and other properties of the mode; this knowledge is essential for an intelligent attack upon the problem of its suppression. For example, it will be noted that the $TE_{011}$ and the $TM_{111}$ modes are represented by a single line as, also, are the $TE_{012}$ and the $TM_{112}$ modes.

Figure 2:
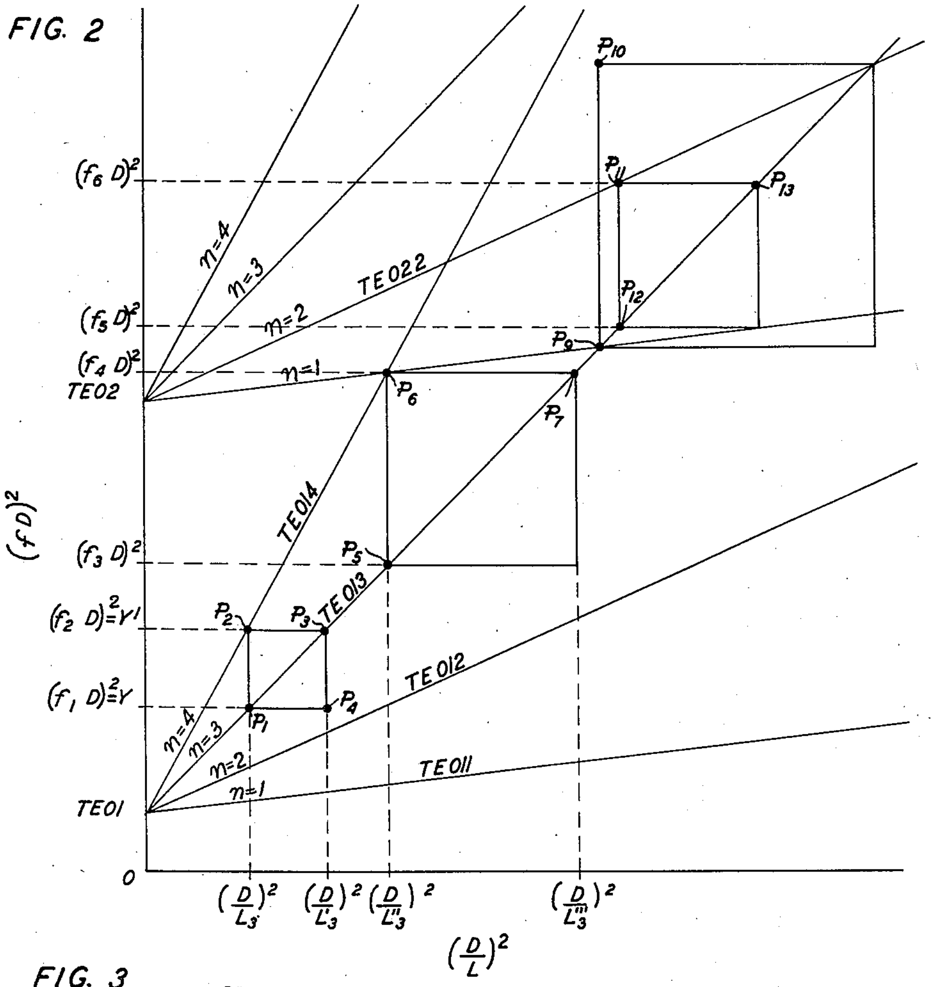
Fig. 2 is a simplified chart illustrating the application of the chart of Fig. 1 to design of a cavity resonator.

Fortunately the TM mode oscillations may be largely inhibited by expedients which interrupt conducting paths in radial directions but which present relatively little loss for oscillations of $TE_0$ modes. One such expedient disclosed and claimed in the application of I. G. Wilson, Serial No. 593,508 filed May 12, 1945, for Selective electrical devices, consists of a peripheral gap around the disc tuning device. Other expedients will serve to suppress other extraneous modes of the transverse electric type, with the possible exception of those of the $TE_{0mn}$ family. With the other extraneous modes substantially eliminated, the mode chart is greatly simplified. A portion of Fig. 1 redrawn with this simplification is shown in Fig. 2 in which the two lower $TE_0$ groups, $TE_{01n}$ modes and the $TE_{02n}$ modes are shown for magnitudes of $n$ from 1 to 4.

Figure 3:
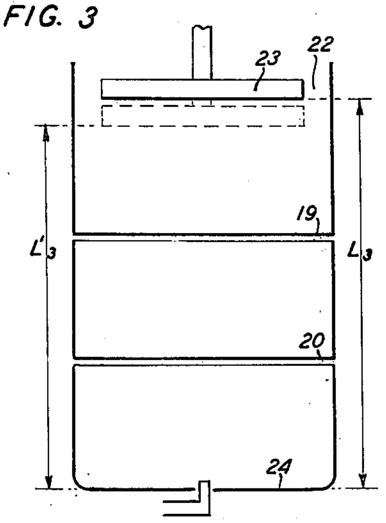
Fig. 3 is a schematic diagram of a resonator for $TE_{013}$ oscillations.

In the design of a cavity resonator there will ordinarily be at least two given design parameters, namely, the frequency $f$ and the quality factor Q, or some function of Q. In addition there may be a requirement that the device be tunable over a given band or range of frequencies. Let us assume to begin with that the magnitude of Q is not of paramount importance and that we are required only to secure a given minimum resonance frequency and to be able to tune over a range of frequencies but that it is required that there be no responses of other $TE_0$ modes at any frequency within the tuning range. Suppose we assume a diameter D which corresponds to that of some standard tubing such that at the prescribed frequency $f_1$, $(f_1D)^2=0Y$. It will be seen that this permits operation at any of several modes as, e. g. $TE_{011}$, $TE_{012}$, $TE_{013}$ or $TE_{014}$, etc. corresponding to magnitudes for $n$ of 1, 2, 3 and 4 respectively. Which of these modes may be chosen will in general depend upon other factors. Of course the less the magnitude of $n$ the shorter the resonator. However, the greater the magnitude of $n$ the higher the magnitude of Q. Moreover, the range of frequencies over which the device may be tuned without encountering interference from extraneous modes is different at different points, as will become apparent. Suppose, for example, that it is desired to design the apparatus of Fig. 3 to operate with $TE_{013}$ mode oscillations and with $f_1$ as the minimum frequency. That will correspond to point $P_1$ on the $TE_{013}$ graph with an ordinate 0Y equal to $(f_1D)^2$ and the abscissa of that point will represent a magnitude $$\left(\frac{D}{L_3}\right)^2$$

where $L_3$ is the required length at the outermost position of the movable end which serves as the tuner. A vertical line may be projected upwardly from $P_1$ until it just falls short of the point $P_2$ at which $TE_{014}$ mode oscillations of a higher frequency than $f_1$ would take place for that same resonator diameter and length. Hence the upper limit of the range of $TE_{013}$ frequencies which we may utilize must be maintained less than the $TE_{014}$ mode frequency at point $P_2$. That upper limiting frequency $f_2$ which we may not exceed corresponds to the point $P_3$ on the $TE_{013}$ mode graph for which the corresponding abscissa is $$\left(\frac{D}{L'_3}\right)^2$$

In other words, we may utilize the continuous range from a maximum length $L_3$ to a minimum length $L'_3$. Since the point $P_4$ lies above the mode line for $TE_{012}$ oscillations, it will be apparent that no oscillation of $TE_{012}$ mode may occur between the lengths $L_3$ and $L'_3$ and which will fall between the limiting frequencies $f_1$ and $f_2$. In other words the band of frequencies extending from $f_1$ to $f_2$ is obtainable with $TE_{013}$ mode oscillations over the range in which the tuner is advanced from one limiting position corresponding to $L_3$ to the other limiting position corresponding to $L'_3$ and no other $TE_0$ mode oscillation within that band is obtainable for any position of the tuner between its two limits. At a different frequency $f_3$ corresponding to the ordinate $(f_3D)^2$ a point $P_5$ on the $TE_{013}$ graph indicates the dimensional relations between D and $L''_3$. The vertically aligned point $P_6$ on the $TE_{014}$ graph indicates by its ordinate the frequency $f_4$ which is the upper limit of the interference free $TE_{013}$ band. At the frequency $f_4$ which corresponds to point $P_7$ on the $TE_{013}$ graph the abscissa indicates the length $L'''$ of the resonator. Therefore in the $TE_{013}$ band extending from frequency $f_3$ to $f_4$ the length of the resonator will vary from $L''_3$ to $L'''_3$ the shorter length $L'''_3$ corresponding to the higher frequency $f_4$.

At a still higher frequency $TE_{013}$ range corresponding to that between the points $P_9$ and $P_{10}$ there is no interference from $TE_{014}$ or $TE_{012}$ mode oscillations. Here, however, the group of $TE_{02}$ mode oscillations comes into play. The $TE_{022}$ mode restricts the upper limit of the free $TE_{013}$ band to the frequency $f_6$ corresponding to the points $P_{11}$ and $P_{13}$ and $TE_{021}$ mode restricts the limiting lower frequency to a frequency $f_5$ corresponding to point $P_{12}$.

If the need for wider range tuning exists, the useful band may be extended beyond the limiting frequencies $f_5$ and $f_6$ by any expedient which will discriminate strongly against $TE_{02}$ mode oscillations while at the same time leaving the $TE_{013}$ mode unattenuated. One such expedient disclosed in application, Serial No. 570,192, filed December 28, 1944, for Frequency selective devices by W. A. Edson, is that of concentric slots in the end plates and in the side walls placed at nodal planes or zones for the desired oscillations which planes or zones are not at nodes for the $TE_{02}$ mode oscillations. In accordance with the teaching of the Wilson application supra, a peripheral annular gap or aperture may also be used about one or both end plates. This affects the $TE_{02}$ mode oscillations much more than the $TE_{01}$ since the $TE_{02}$ mode has its maximum electric vector intensity in a circular zone at a distance of only $$\frac{D}{8}$$

from the periphery while the maximum electric vector intensity of the $TE_{01}$ modes occurs in a zone at a distance $$\frac{D}{4}$$

from the periphery. A similar effect is obtained by circumferential apertures 19 and 20 in the cylindrical walls along the nodal planes for $TE_{013}$ mode oscillations at distances of one-third L from each end of the cylinder. These apertures permit a certain amount of energy of both $TE_{021}$ and $TE_{022}$ mode oscillations to leak out since these planes are adjacent to relatively high intensity zones for the $TE_{021}$ mode and are at the maximum intensity zones for $TE_{022}$ mode oscillations.

Figure 4:
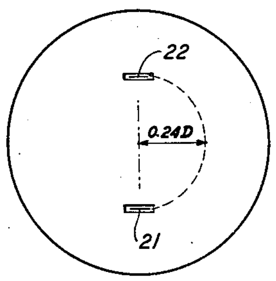
Fig. 4 is a plan view of Fig. 3.

In addition to the expedients which have been described for discriminatory attenuation by the resonator itself, it is also possible to take advantage of the positioning of the input or output coupler. By locating the coupler at a point which is least effective for transduction of the unwanted modes and which is effective for the desired mode, it is possible to enhance the discriminatory effect. For example, the $TE_{013}$ coupler may be a loop projecting through an end plate with the coupling end portion of the loop extending in a direction tangential to the circular electric vector at a distance from the center of approximately 0.24D at which the maximum intensity zone of $TE_{01}$ modes occurs. The coupling may be made substantially zero for the $TE_{02}$ mode by a slight compromise which involves placing the loop as indicated in Fig. 4 in a position with its coupling end tangential to the nodal circle for $TE_{02}$ mode. That $TE_{02}$ mode nodal circle occurs very close to the optimum position for $TE_{01}$ mode. Where separate input and output loops 21 and 22 are employed they may be located at diametrically opposite positions as indicated in Fig. 4.

The problem of coupling to a variable tuning resonator in such manner as to render the coupling relatively unaffected by the tuning operation is nicely solved by this expedient. With the tuner at one end of the cylinder and the coupler at the other the tuner exerts a minimum of disturbance upon the coupler both mechanically and electrically. The coupler remains at the most effective coupling position irrespective of changes in position of the tuner. Preferably the coupling loop or loops are introduced as long square loops which pass through relatively narrow slots with a very small projection into the cavity. This minimizes any electrostatic coupling since the walls of the slot itself serve as a shield. Moreover the position and plane of the loop are such as to make it relatively ineffective for most modes of oscillation of other than $TE_0$ types thus augmenting the discrimination against $TM_1$ and other undesired modes of oscillation. Accordingly such a coupling yields a more uniform Q for the resonator over its entire frequency range.

Discrimination of the resonator against TM mode oscillations and in favor of the desired $TE_0$ mode oscillations is therefore afforded by use of the proper $$\frac{D}{L}$$

ratio, by the peripheral aperture 22 surrounding the tuning disc 23 and by the character, location and orientation of the coupling loops.

It is, of course, to be understood that a cavity resonator may have other natural inherent modes of oscillation at higher frequencies which are above the upper limit of the tuning frequencies and which may give misleading responses when the resonator is used with a detector. These will in general be had with higher order modes. If the various expedients of mode suppression apertures and of specially positioned couplings do not sufficiently discriminate against these higher frequency oscillations, they may be inhibited by modification of the transmission characteristics of the feed line or of the antennas with which the resonator is connected.

It will be apparent that from the standpoint of getting the largest frequency ratio between the limiting frequencies for a given $TE_{01n}$ mode one should operate just below the $TE_{021}$ line, that is, with the frequency band $f_3$ to $f_4$. This requires a relatively low value of $$\frac{D}{L}$$

for example, in the $TE_{0,1,12}$ mode $$\frac{D}{L}=.289$$

and the ratio of $f_4$ to $f_3$ is 1.056 for this case. If $$\frac{D}{L}$$

is larger so that circumstances are as at $f_5$ and $f_6$, a sharp reduction in the interference free ratio occurs. If, therefore, it is necessary to operate in this higher frequency field and it is desired to obtain a wider band, i. e. a higher ratio between limiting or cutoff frequencies, it is possible to go to larger values of $$\frac{D}{L}$$

This cannot be carried too far, however, or interference will be introduced from the next higher $TE_0$ mode group and specifically from the $TE_{031}$ mode. For the $TE_{0,1,12}$ mode $$\frac{D}{L}$$

must not be greater than about .5. This limits the ratio of the limiting frequencies to 1.036 as set by $TE_{029}$ and $TE_{02,10}$ modes. In summary it may be stated that for tunable cylindrical resonators operating in the $TE_{01n}$ mode the maximum value of the ratio of upper to lower frequencies without interference from the $TE_{01(n+1)}$ mode is obtained with a cylinder diameter which barely supports the $TE_{021}$ mode. If Q considerations dictate a larger diameter, the next largest interference-free ratio will now be obtained with a cylinder diameter which just fails to support the $TE_{031}$ mode.

The maximum clear frequency range ratio $$\frac{f_4}{f_3}$$

for $TE_{01n}$ modes as limited by extraneous responses from $TE_{01(n+1)}$ modes and $TE_{021}$ modes has been calculated as follows:

| $n$ | 1 | 2 | 3 | 4 | 5 | 12 | 17 | 50 |
|---|---|---|---|---|---|---|---|---|
| $\frac{f_4}{f_3}$ | 1.523 | 1.295 | 1.206 | 1.159 | 1.130 | 1.056 | 1.042 | 1.013 |
| $\left(\frac{D}{L}\right)_{min}$ | 2.160 | 1.323 | 0.966 | 0.764 | 0.632 | 0.289 | 0.208 | 0.073 |

Figure 5:
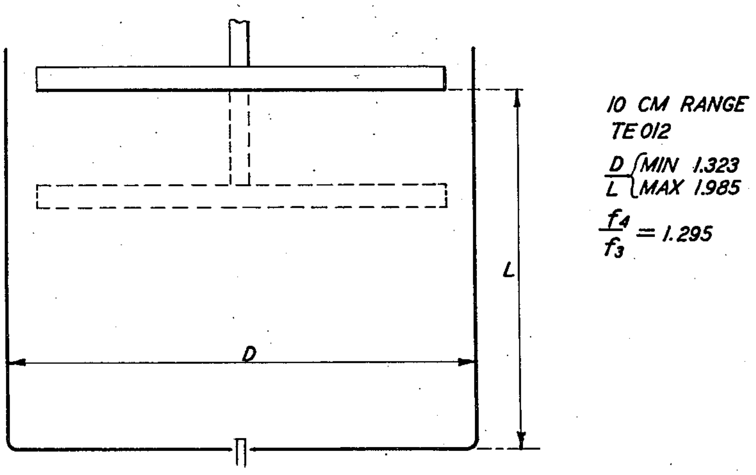
Fig. 5 is a schematic diagram of a resonator for operation in the 10-centimeter wavelength range.

Fig. 5 discloses a design of a $TE_{012}$ mode oscillation operating in the region of 3000 megacycles (10 centimeters). The ratio of limiting frequencies obtainable is 1.29. This is the example given under where $n=2$.

Figure 6:
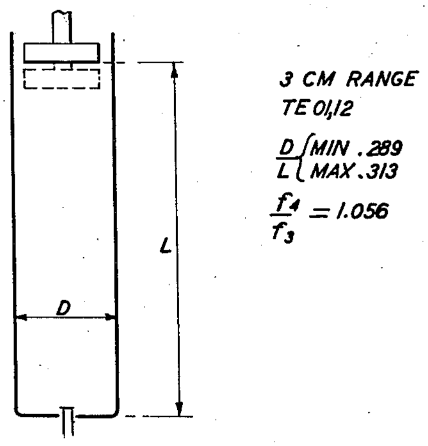
Fig. 6 is a diagram of a resonator for operation in the 3-centimeter wavelength range.

Fig. 6 illustrates a $TE_{01,12}$ mode oscillator operating in the region of 10,000 megacycles (3 centimeters). The ratio of limiting frequencies is 1.056. This is the example given under where $n=12$.

Figure 7:
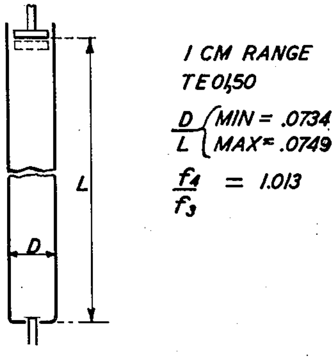
Fig. 7 is a similar diagram of a resonator for operation in the 1-centimeter wavelength range.

Fig. 7 presents a $TE_{0,1,50}$ mode oscillator operating in the region of 30,000 megacycles (1 centimeter). The ratio of limiting frequencies for the clear range is 1.013. This is the example given under where $n=50$.

It will therefore be apparent that by use of a mode chart constructed as in Figs. 1 and 2 to show the clear regions in accordance with this invention, it is possible to construct resonators having extremely important characteristics. Such resonators are electrical oscillation selectors depending upon electromagnetic fields oscillating in an enclosed space but which effectively behave as if having a single degree of freedom. What is especially important this single degree of freedom characteristic is attainable together with variable tuning thus enabling such a selector to be varied at will to selectively respond to any single frequency within a desired range and with each of its response frequencies of the same mode whereby the coupler may remain effective throughout the range of frequencies.

What is claimed is:

A cavity resonator comprising a hollow cylinder of electrically conducting material, means for exciting said resonator to execute oscillations of $TE_{013}$ mode comprising an input element extending through a wall of the resonator to a position tangential to the circular electric vector of the $TE_{013}$ electromagnetic field at a point substantially midway between the center of the cylinder and its perimeter, said cylinder having circumferential discontinuities in its walls at points approximately one-third of the distance from each end to the other end.

JOHN P. KINZER.

REFERENCES CITED

The following references are of record in the file of this patent:

UNITED STATES PATENTS

| Number | Name | Date |
|---|---|---|
| 2,151,118 | King et al. | Mar. 21, 1939 |
| 2,439,388 | Hansen | Apr. 13, 1948 |